March 25, 1958  D. SCARPELLI  2,827,841
ADJUSTABLE MOUNTING APPARATUS FOR PHOTOGRAPHIC
EQUIPMENT AND THE LIKE
Filed Feb. 11, 1954
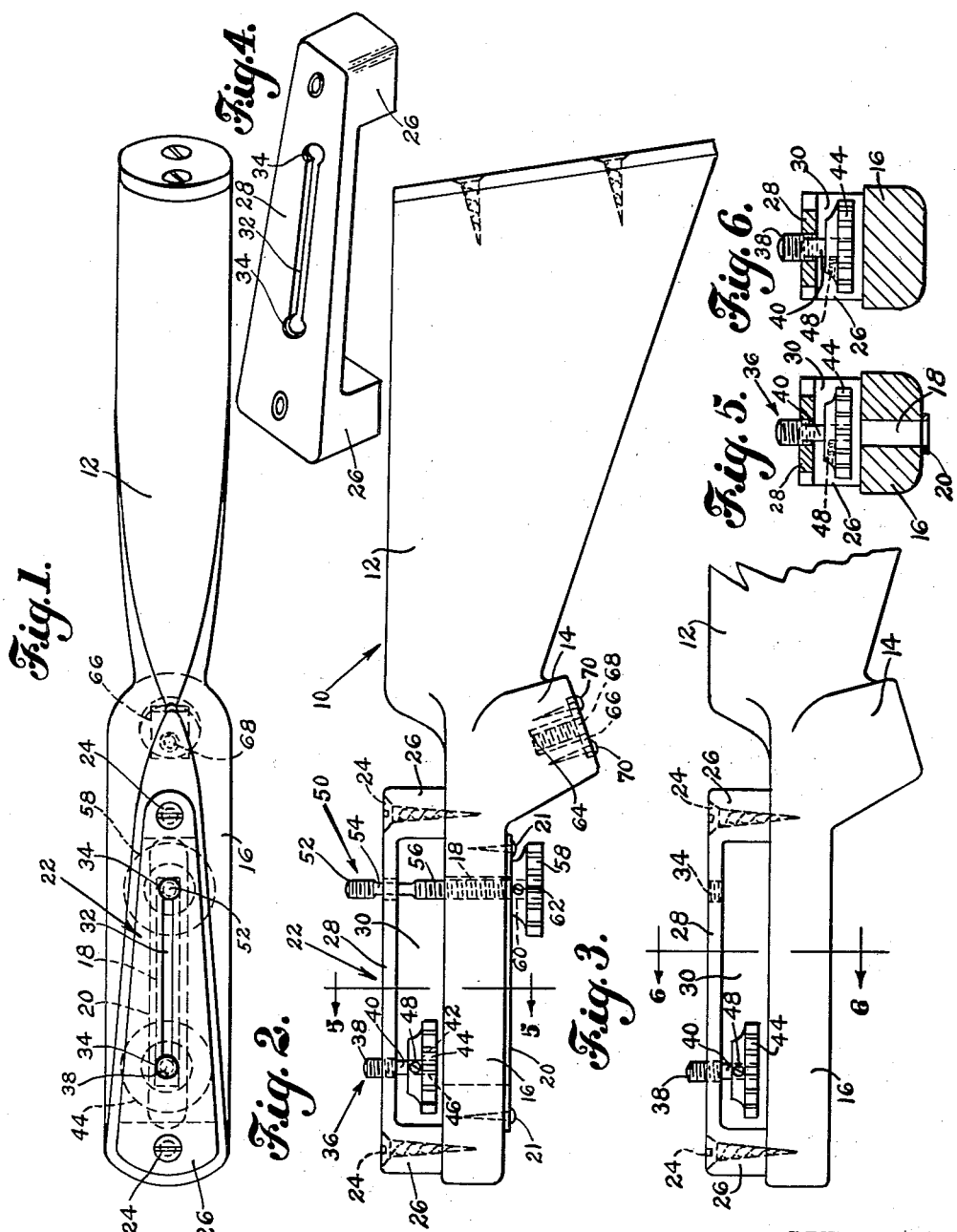
INVENTOR.
Donato Scarpelli
BY Harold E. Cole
Attorney

United States Patent Office 2,827,841
Patented Mar. 25, 1958

2,827,841

ADJUSTABLE MOUNTING APPARATUS FOR PHOTOGRAPHIC EQUIPMENT AND THE LIKE

Donato Scarpelli, Weymouth, Mass.

Application February 11, 1954, Serial No. 409,678

2 Claims. (Cl. 95—86)

This invention relates to adjustable mounting apparatus for cameras and the like.

One object of my invention is to provide mounting apparatus for a camera or the like, which has simple adjusting means and which can readily be attached to the forearm of a gun stock or similar support.

Another object is to provide such mounting apparatus that can also adjustably hold a special camera attaching member as well as a camera.

A further object is to provide camera attaching means for my mounting apparatus that will remain associated with the latter, ready for use, at all times.

The foregoing and other objects which will appear as the nature of the invention is better understood, may be accomplished by a construction, combination and arrangement of parts such as is disclosed by the drawing. The nature of the invention is such as to render it susceptible to various changes and modifications, and therefore, I am not to be limited to the construction disclosed by the drawing nor to the particular parts described in the specification; but am entitled to all such changes therefrom as fall within the scope of my claims.

In the drawings:

Figure 1 is a top plan view of my adjustable mounting apparatus.

Figure 2 is a side elevational view thereof.

Figure 3 is a side elevational view, broken away, of a modified form of main support with my mounting member in position thereon.

Figure 4 is a perspective view of my mounting member.

Figure 5 is a sectional view taken on the line 5—5 of Figure 2.

Figure 6 is a sectional view taken on the line 6—6 of Figure 3.

As illustrated, a support 10 is shown as a gun stock, although other supports could be used. It has a shoulder end 12, a pistol grip part 14 and a platform portion in the form of a forearm 16. A longitudinal slot 18 extends vertically, in position of use, through said platform portion 16 and which is reinforced by a slotted plate 20 held by screws 21.

A mounting member 22, which may be made of metal, wood or plastic, or other material, is adapted to be attached to said main support by screws 24 which extend through legs 26 of said mounting member at opposite ends of an intermediate portion 28 thereof. The main body of this mounting member 22 is shown tapering in width, in position of use, from the front or free end towards the rear. It has ample space 30 under said intermediate portion 28 and between said legs 26.

An elongate slot 32 extends through said intermediate portion 28, the end extremities 34 of which slot are arcuate-shaped and screw-threaded, and of greater width than adjoining portions of said slot. This slot 32 is in alinement with said platform slot 18 when the parts are assembled in position for use.

To adjustably hold a camera or other apparatus to my mounting member 22, when the latter is firmly attached to said support 10, I provide a connector member 36 shown as a thumb screw. It has a screw-threaded, shank portion outer end 38, a reduced, intermediate shank portion 40, and an attaching or inner end, shank portion 42. A handle in the form of a knurled nut 44, having an end opening 46 therein, is attached to said shank portion 42 by means of a set screw 48 entering a screw-threaded hole extending laterally in said nut 44. This enables one to vary the length of said connecting member 36, depending upon the distance said shank portion 42 extends into said opening 46, said set screw 48 serving to hold the shank in any predetermined position therein. Said threaded outer end portion 38 is the part that ordinarily enters a screw-threaded hole provided in a camera or the like.

Said connector member 36 is preferably of such an over-all length that it exceeds the distance between the top of said gun stock forearm 16 and the top of said mounting member 22, hence it will remain between these two elements until they are separated by removing said screws 24. Said connector member reduced shank portion 40 is of a size that is freely slidable in said mounting member slot 32, hence a camera, or the like, may be moved along said mounting member 22, while attached to said connector member 36, the full length of said elongate slot 32.

When it is desired to use a longer connector member that will extend from under the gunstock forearm, in position of use, through said slots 18 and into screw-threaded engagement with a said end extremity hole 34, I provide a longer thumb screw 50. It has a threaded outer end shank portion 52, a reduced intermediate shank portion 54 and an attaching or inner end portion 56 to which a knurled nut 58, having an end opening 60, is attached by means of a set screw 62 entering a screw-threaded hole extending laterally into said nut 58.

If preferred, this relatively long connector member 50 may be used to attach a camera or the like to said mounting member 22 instead of the shorter said connector member 36. Also when a special attaching member is to be held on said mounting member 22 both of said connector members 36 and 50 may be used, one of which holds the attaching member and mounting member together, while the other extends through both of the latter and connects with the camera. They are shown in position for this use together in said Figure 2 of the drawing.

In said piston grip part 14, I show a hole 64 in which is set a metal plate 66 having a screw-threaded hole 68 therein and held to said grip part by screws 70. This arrangement permits my support 10 to connect with a tripod when desired, or a handle.

In said Figure 3, said platform portion 16 is shown without a slot, in which arrangement said connector member 36 only can be used.

To get either or both of said connector members 36 and 50 into said slot 32, either of said screw-threaded outer ends 38 and 52 respectively, or both, is screwed through a said screw-threaded outer end extremity 34. in said slot until a reduced shank portion 42 or 54, or both, is reached, whereupon the connector members may be slid along said slot 32 to any desired position.

To move a camera or similar equipment that is mounted on said mounting member 22, one need only loosen a said connector member 36 or 50, and slide it along in said slot 32, which carries said camera to the desired position. This can be accomplished by using either connector member 36 or 50. However, if the forearm 16 shown in Figure 3 of the drawing is used, which has no slot therein, only said short connector member 36 can be used.

What I claim is:

1. A support in combination with a mounting member supported thereby, said support embodying a platform portion having an elongate slot therethrough, said mounting member embodying a body having two leg portions at opposite ends thereof and an intermediate portion between said two leg portions of such thickness that there is a space immediately below said intermediate portion and between said two leg portions, said platform portion and said leg portions having holes therein, members extending into said holes to hold said platform portion and leg portions together, said intermediate portion having an elongate slot therein in alinement with said platform portion slot and terminating at opposite ends in arcuate, screw-threaded holes, two connector members each embodying a shank extending from outside said mounting member through a said slot embodying a screw-threaded portion adapted to screw-threadedly connect with said arcuate, screw-threaded holes and being of greater width than the width of said mounting member slot and embodying a reduced part that is slidable in said mounting member slot, and a handle attached to said shank and outside of said mounting member slot.

2. A support in combination with a mounting member supported thereby, said support embodying a platform portion, having an elongate slot therethrough, said mounting member embodying a body having two leg portions at opposite ends thereof and an intermediate portion between said two leg portions of such thickness that there is a space immediately below said intermediate portion between said two leg portions, means holding said platform portion and leg portions together, said intermediate portion having an elongate slot therein in alinement with said platform portion slot and terminating at opposite ends in arcuate, screw-threaded holes of greater width than the adjoining portion of said slot, a connector member embodying a shank extending between said platform portion and said mounting member in said space and through said mounting member slot, and another connector member embodying a shank extending from outside said platform portion through both said slots, both said shanks embodying screw-threaded portions adapted to screw-threadedly connect with said arcuate, screw-threaded holes and being of greater width than the width of said mounting member slot and embodying a reduced part that is slidable in said mounting member slot, and a handle attached to said shank outside of said platform portion.

References Cited in the file of this patent

UNITED STATES PATENTS

| | | |
|---|---|---|
| 1,156,885 | Caine | Oct. 19, 1915 |
| 2,165,512 | Schofield | July 11, 1939 |
| 2,235,355 | Brown | Mar. 18, 1941 |
| 2,530,912 | Secofsky | Nov. 21, 1950 |
| 2,652,220 | Nocht | Sept. 15, 1953 |
| 2,667,110 | Youtcheff | Jan. 26, 1954 |
| 2,667,825 | Nicholas | Feb. 2, 1954 |